March 11, 1941.  A. N. FAULKNER  2,234,431
METHOD AND APPARATUS FOR BONING AND CUTTING FISH
Filed Sept. 2, 1939  3 Sheets-Sheet 1
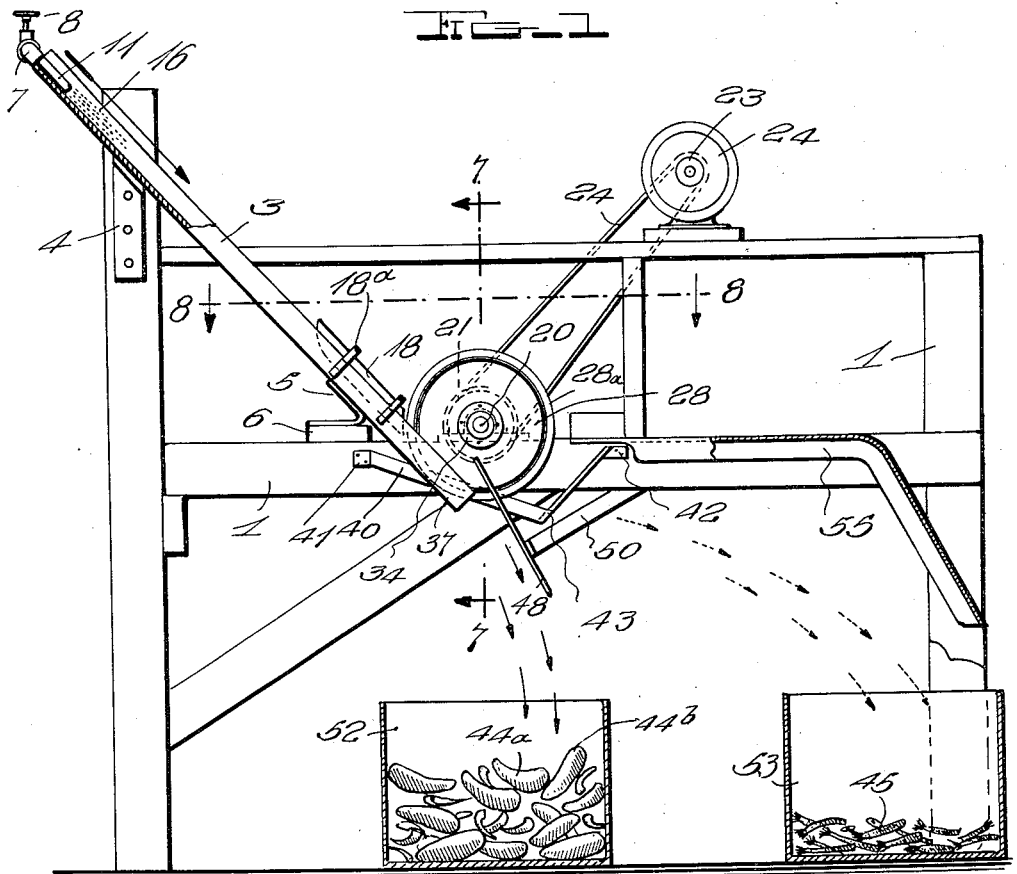
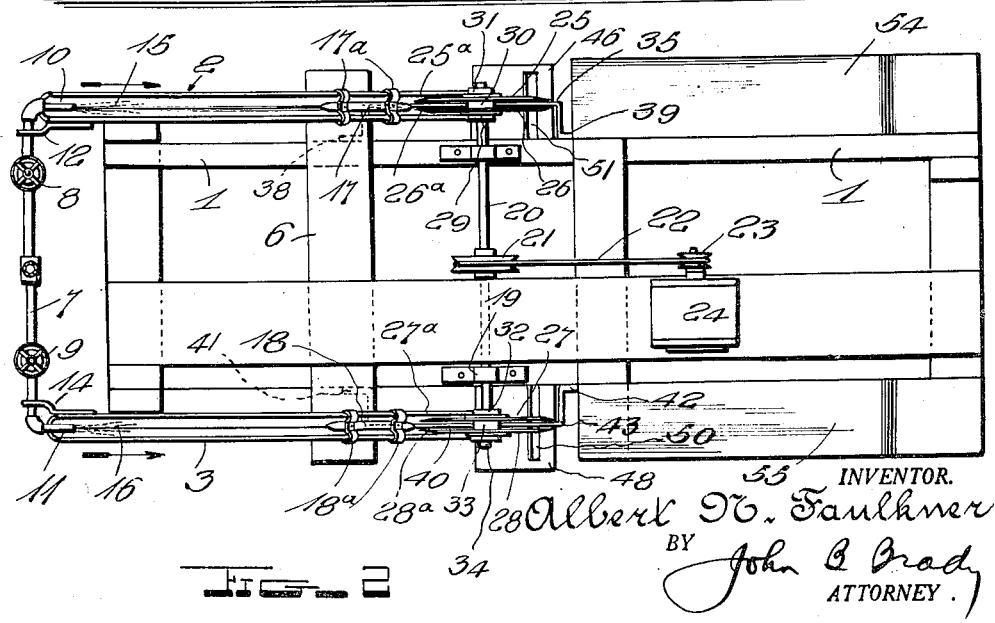
INVENTOR.
Albert N. Faulkner
BY John C. Brady
ATTORNEY.

March 11, 1941. A. N. FAULKNER 2,234,431
METHOD AND APPARATUS FOR BONING AND CUTTING FISH
Filed Sept. 2, 1939 3 Sheets-Sheet 2
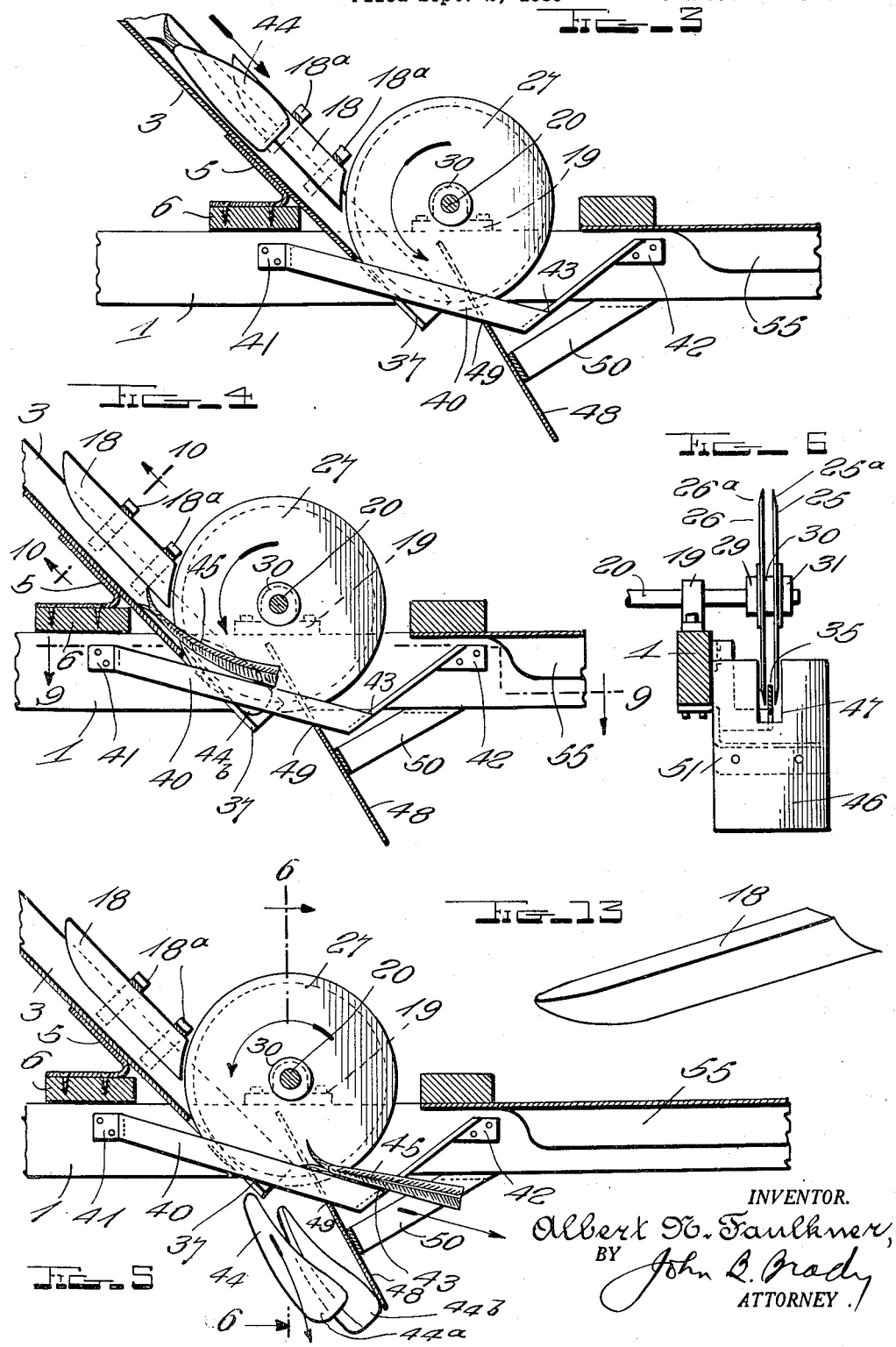
INVENTOR.
Albert N. Faulkner,
BY John L. Brady
ATTORNEY.

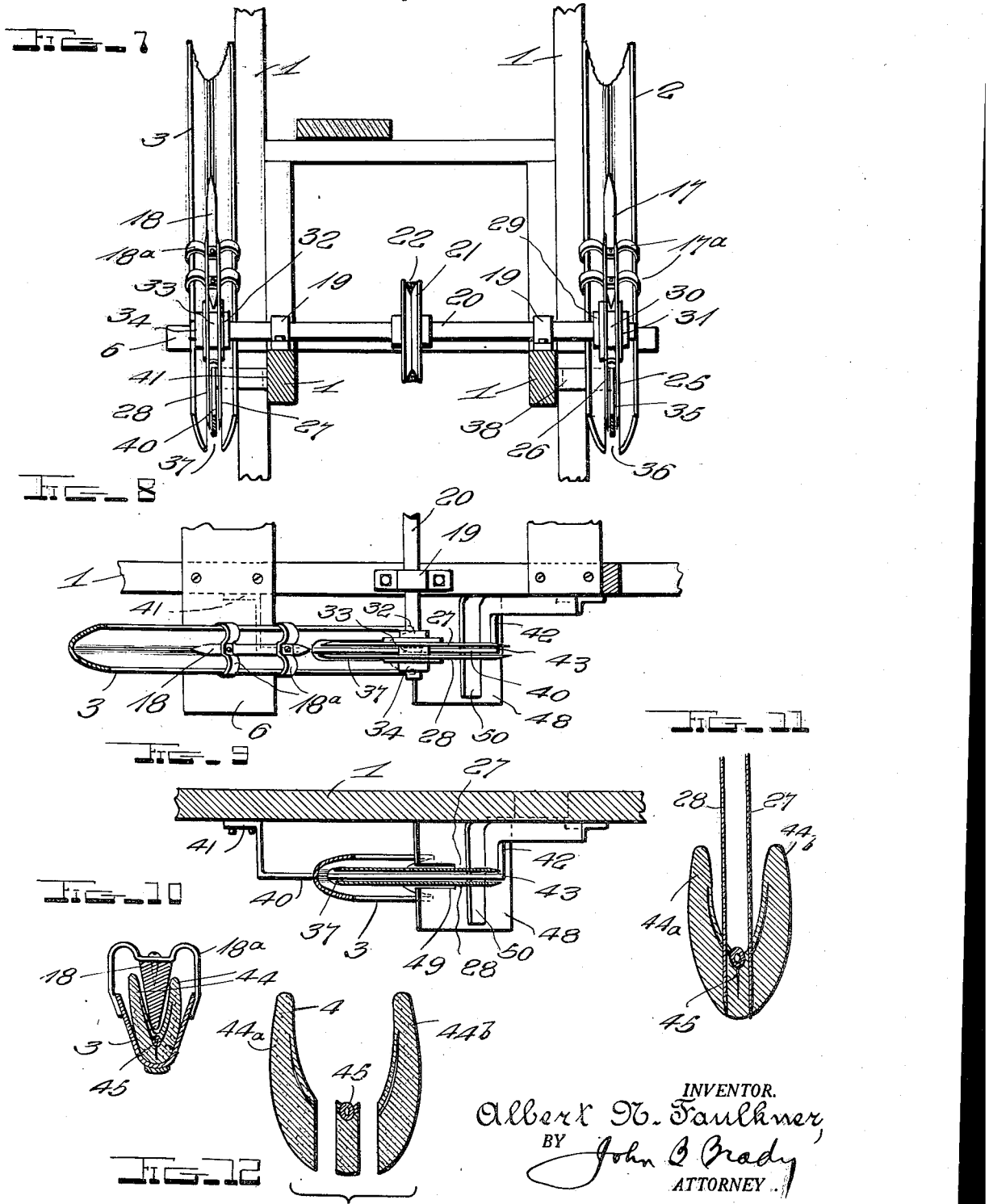

Patented Mar. 11, 1941

2,234,431

UNITED STATES PATENT OFFICE 2,234,431

METHOD AND APPARATUS FOR BONING AND CUTTING FISH

Albert N. Faulkner, Tilghman, Md.

Application September 2, 1939, Serial No. 293,294

15 Claims. (Cl. 17—3)

My invention relates broadly to an improved method and apparatus for boning and cutting fish and more particularly to a quantity production method of boning and cutting fish which requires minimum skill on the part of operatives and which is capable of preparing fish for the market in an efficient manner.

One of the objects of my invention is to provide an improved method and apparatus for boning and cutting fish which is inexpensive to install and operate and which may be carried out with minimum skill and attention by operatives.

Another object of my invention is to provide an efficient method of boning and cutting fish in which the fish after being cleaned are conveyed to a boning and cutting machine which automatically removes the bones from the fish and discharges the bones into one container and delivers the fillets into a separate container.

Still another object of my invention is to provide a method and apparatus for cutting fillets in which the fish is passed through a cutting mechanism by passing the fish along a confined path in contact with running water and cutting the fish to remove and discharge the bones therefrom while delivering the fillets substantially free of bones.

A further object of my invention is to provide a method and apparatus particularly suitable for boning and cutting herring which have innumerable fine bones and which are difficult to prepare for the market by hand processes, the method and apparatus of my invention providing means for passing the herring through a confined path in contact with water, centering the herring with respect to a cutting mechanism and passing the herring through the cutting mechanism for slicing fillets from the herring and severing the bones therefrom and guiding the bones through the cutting mechanism for discharge remote from the fillets.

A still further object of my invention is to provide a construction of double trough assembly constituting confined flow paths for water along which fish may be conveyed to simultaneously operating cutting devices and with respect to which the fish are centered and passed for slicing fillets from the fish and discharging the bones therefrom centrally through the cutting devices whereby the fillets are rapidly delivered substantially free of bones in a marketable form.

Other and further objects of my invention reside in the improved method of boning and cutting fish and apparatus for carrying out the process of my invention as set forth more fully in the specification hereinafter following by reference to the accompanying drawings, in which:

Figure 1 is a side elevational view with parts broken away and illustrated in section showing the apparatus of my invention; Fig. 2 is a plan view of the apparatus illustrated in Fig. 1; Fig. 3 is a sectional view showing the construction of one of the cutting units and a portion of the conveying mechanism and illustrating the fish entering the centering mechanism preparatory for passage through the cutting mechanism; Fig. 4 is a cross sectional view showing the fish in the course of passage through the cutting mechanism in which the fillets are about to be completely severed from the fish and illustrating the manner in which the bones of the fish are guided through the cutting mechanism and separated from the fillets; Fig. 5 is a cross sectional view showing the fish just after passing through the cutting mechanism and illustrating the fillets prepared in marketable form and showing the bones being discharged separately from the fillets; Fig. 6 is a fragmentary sectional view taken substantially on line 6—6 of Fig. 5; Fig. 7 is a vertical sectional view taken substantially on line 7—7 of Fig. 1; Fig. 8 is a fragmentary horizontal sectional view taken substantially on line 8—8 of Fig. 1; Fig. 9 is a fragmentary horizontal sectional view taken substantially on line 9—9 of Fig. 4; Fig. 10 is a transverse sectional view through the conveyor for the fish and the centering mechanism for the fish in the course of the passage thereof along the conveyor taken on line 10—10 of Fig. 4; Fig. 11 is an enlarged sectional view showing the cutting mechanism operating to sever the backbone of the fish for separating the fillets; Fig. 12 is a view illustrating the fillets separated from the backbone and wherein the backbone is ready for discharge through the cutting mechanism and the fillets prepared for the market; and Fig. 13 is a perspective view of the centering mechanism adjacent which the fish pass before entering the cutting mechanism.

The method and apparatus of my invention have been developed for the purpose of increasing production of fillets and preparing fillets for the market in a form not possible of accomplishment by hand. The tedious hand processes of attempting to remove the numerous fine bones from herring generally results in rendering the fillets unfit for the market independently of the fact that the time consumed renders such hand processes impractical. By use of the method and apparatus of my invention I am able to prepare fillets for the market at a rate of production which is governed practically by the speed at which operatives are able to successively position the fish in the hydraulic conveyors employed in the apparatus of my invention. The centering and cutting mechanism of my invention operates at a higher rate of speed as the fish are moved therethrough by the hydraulic conveyors.

The apparatus of my invention comprises a frame structure having a pair of inclined hydraulic conveyors arranged in opposite sides thereof down which water is continuously flowed and adjacent the end of which there are arranged a centering mechanism and a cutting mechanism, the centering mechanism being disposed in advance of the cutting mechanism whereby the fish in the course of passage along the hydraulic conveyors are prepared for entry into the cutting mechanism. The cutting mechanism comprises units individual to each hydraulic conveyor, the units being driven from the same driving mechanism, such as an electric motor. Each of the units comprises a pair of spaced rotary discs having razor-like cutting edges at their peripheries. The rotary discs of each unit are spaced for a distance sufficient to allow the backbones of the fish to pass freely therebetween and to be separated from the fillets and discharged remote from the fillets while the fillets are delivered in marketable form. In the boning and cutting of herring, which have innumerable fine bones, the discs may be set with their inner faces as close together as one-eighth of an inch, which is a sufficient distance to bridge the limits of the backbones when the apparatus operates with the precision and accuracy intended. I provide a guide bar passing between the discs of each unit and serving as a guide means in coaction with the bifurcated end of the trough-like conveyor through which the rotary discs project for separating the bones from the fillets as the cutting process advances and discharging the bones independently of the fillets.

When the apparatus of my invention is functioning in routine production at high speed, the bones of the fish often are discharged with such force and rapidity that they strike an especially arranged guard aligned with the guide bar and are directed thereby into a collecting container, the fillets dropping at the same time into a collector remote from the position in which the bones are collected. An operative stands at each side of the apparatus of my invention and positions the fish, which have been previously decapitated and eviscerated, in the hydraulic troughs. The running water of the hydraulic conveyors moves the fish rapidly toward the centering and cutting mechanism and the process which is carried out practically depends upon the rate of speed at which the operatives are able to replenish the fish in the hydraulic conveyors. The method of my invention enables the fillets to be prepared in an attractive form for the market.

Referring to the drawings in more detail, reference character 1 indicates the frame structure of the apparatus of my invention on which there are arranged the inclined hydraulic conveyors 2 and 3. The conveyors 2 and 3 are substantially V-shaped in cross section and are disposed at opposite sides of frame 1 in such manner that operatives may stand at each side of the frame and place the fish successively adjacent the top of hydraulic conveyors 2 and 3. The hydraulic conveyor 3 is supported adjacent its upper end by a support indicated at 4 and at its lower end by a support indicated at 5 mounted on transverse member 6 on frame 1. A water supply pipe 7 is provided with hand valves 8 and 9 disposed therein for controlling the supply of water through spouts 10 and 11 to the upper ends of the hydraulic conveyors 2 and 3. A support 12 is provided between the water supply pipe and the upper end of hydraulic conveyor 2. A support 14 is provided between the water supply pipe and the upper end of hydraulic conveyor 3. The water stream 15 is supplied to hydraulic conveyor 2 while water stream 16 is supplied to hydraulic conveyor 3. Either hydraulic conveyor may be shut down by control of hand valves 8 and 9.

Each hydraulic conveyor has a centering mechanism mounted therein adjacent the lower end thereof. The centering mechanism for hydraulic conveyor 2 is indicated at 17 having attaching means 17a for mounting the centering mechanism with respect to the hydraulic conveyor 2. The centering mechanism for hydraulic conveyor 3 is indicated at 18 and is disposed in position adjacent the lower end of hydraulic conveyor 3 by attaching means 18a.

The frame structure 1 has bearings 19 mounted thereon in transverse alignment to provide bearing means for the transverse rotary shaft 20 which extends substantially in alignment with the lower extremities of the hydraulic conveyors 2 and 3. The shaft 20 has a driven pulley 21 thereon which is rotatably driven through belt 22 extending from driving pulley 23 on driving motor 24 carried by frame 1. It will be understood that any other form of driving mechanism may be employed and that the particular form illustrated is shown only by way of example.

Each rotary unit constituting the cutting mechanism comprises a set of coacting rotary discs 25 and 26 and 27 and 28, each rotary disc having a chamfered peripheral edge on its external surface whereby each rotary disc is tapered to a razor-like cutting edge indicated at 25a, 26a, 27a and 28a. The flat surfaces of the rotary discs extend parallel to each other and are spaced for a distance suitable for slicing fillets from opposite sides of the bones of the fish. As represented for example in Fig. 6, the rotary discs are assembled so that rotary disc 26 abuts against flange 29 with a spacing member 30 intermediate the discs 25 and 26 with a flange and nut 31 engaging the exterior of disc 25 for clamping the discs 25 and 26 in assembled relation so that the discs are rotatably driven by shaft 20. Similarly, disc 27 abuts against flange 32 carried by shaft 20 and spacing member 33 is disposed between discs 27 and 28 with flange and nut 34 engaging the external surface of disc 28 for clamping discs 27 and 28 in spaced assembled relation adapted to be simultaneously driven from motor 24 through shaft 20.

I provide a guide bar 35 which extends through slot 36 in the lower extremity of the hydraulic conveyor 2 and between rotary discs 25 and 26. The lower extremity of hydraulic conveyor 3 is similarly slotted as indicated at 37. The guide bar 35 has the upper end thereof supported on frame 1 as indicated at 38 while the lower end of the guide bar 35 is supported on frame 1 as indicated at 39 as shown more clearly in Fig. 2. Guide bar 40 extends between rotary discs 27 and 28 as indicated in Figs. 1 to 10, inclusive. The guide bar 40 is supported adjacent its upper end on frame 1 as indicated at 41 and at its lower end on frame 1 as indicated at 42. The guide bars 35 and 40 are centered with a high degree of precision in the space between discs 25 and 26 and between discs 27 and 28, respectively. Inasmuch as this distance in certain adjustments of the mechanism is of the order of one-eighth of an inch, it will be appreciated that the guide bar must be very accurately mounted and rigidly supported. The ends of each guide bar are bent into planes normal to the center line of the guide bar as it extends between the rotary discs. The guide bar passes through the rotary discs in an inclined direction and through the slotted end of the hydraulic conveyor. The upper end of the guide bar passes into the space between the rotary discs substantially at the intersection of the rotary discs with the slotted end of the hydraulic conveyor. The exterior edge of the guide bar is substantially tangent to the peripheral edge of the rotary discs. The guide bar extends along an inclined plane which is substantially at an acute angle with respect to a horizontal plane passing through the transverse axis of the shaft which carries the discs as compared with the independent obtuse angle which the hydraulic conveyor makes with respect to the horizontal plane passing through the axis of the shaft of the rotary discs. This permits a change in direction of movement of the bones of the fish to be effected during the slicing operation, in which the fillets are released for collection beneath the cutting mechanism. The upper edge of the guide bar 40, for example, serves as a guiding edge for the bones indicated at 45 as the bones are severed from the fillets.

In Fig. 3 I have shown the fish 44 being driven down the hydraulic conveyor 3 and centered by the centering mechanism 18. Fig. 13 illustrates a perspective view of the centering mechanism 18. Fig. 10 shows in cross section the manner in which the fish 44 are centered preparatory for the cutting operation. The bones of the fish 44 are indicated at 45. In Fig. 4 the water flowing down the hydraulic conveyor 3 has forced the fish partially through the cutting mechanism and the bones 45 are being severed from the fillets 44a and 44b. The bones are illustrated riding upwardly on guide bar 40. The fillets 44a and 44b on the other hand, are forced to follow the hydraulic conveyor under the force of the flowing water, and at the instant of severance of the fillets from the bones, the fillets strike the guide plate 46 individual to conveyor 2 and guide plate 48 individual to conveyor 3. The guide plate 46 is supported with respect to frame 1 by means of bracket 51, while guide plate 48 is mounted with respect to frame 1 by means of bracket 50. Guide plate 46 is slotted at 47 and embraces the sides of rotary discs 25 and 26 and guide bar 35 therebetween, the discs 25 and 26 revolving through the slotted portion 47 of the guide plate 46. The guide plate 48 is slotted as represented at 49 to embrace the rotary discs 27 and 28 and the guide bar 40 therebetween, the discs 27 and 28 revolving through the slotted portion 49 of guide plate 48. The guide plates 46 and 48 are closely associated with the sides of the revolving discs and directly guide the fillets 44a and 44b from the ends of the conveyors into a suitable collecting receptacle 52. It will be observed that guide plates 46 and 48 are inclined in a plane which makes a smaller obtuse angle with respect to a horizontal plane passing through the axis of transverse shaft 20 than the obtuse angle between the inclined hydraulic conveyors 2 and 3 and the horizontal plane passing through the axis of transverse shaft 20. That is to say, the guide plates 46 and 48 are directed downwardly to change the direction of movement of the fillets as they pass from the cutting mechanism. The force of the flowing water carries the fillets free of the cutting mechanism, while the guide plates 46 and 48 direct the fillets into the collecting receptacle 52 (Fig. 1). Inasmuch as the water continuously flows along the hydraulic conveyors, the fillets are washed as they are cut. The flowing water which continues to force the fillets through the cutting mechanism discharges into the collecting receptacle 52, which is generally of wire-basket construction for quickly releasing the water from the fillets.

While the fillets 44a and 44b have their direction of movement changed by guide plates 46 and 48 and are gravitated into the receptacle 52, I take advantage of the momentum which is imparted to the bones 45 during the cutting process by guiding the bones along guide bars 35 and 40 and discharging the bones into receptacle 53 remote from receptacle 52 containing the fillets. Very often the bones leave the cutting mechanism with such momentum that they strike the guards 54 and 55 shown more particularly in Figs. 1 and 2 from which the bones are directed into the receptacle 53.

The method of my invention contemplates the initial decapitating and eviscerating of the fish and then the positioning of the fish in the hydraulic conveyors in such manner that the open belly portion of the fish is centered by centering mechanism 17—18 preparatory for the cutting operation. The flow of water along the hydraulic conveyors tends to continuously wash the fish, at the same time forcing the fish through the centering and cutting mechanism. The cutting operation is carried out speedily and the bones discharged in a direction which makes a substantially acute angle with respect to the horizontal plane of the transverse shaft 20, while the fillets are discharged at a different angle with respect to the horizontal plane of the axis of the transverse shaft 20. The speed at which the cutting mechanism operates is limited only by the ability of the operatives to position the successive fish in the hydraulic conveyors. The fillets formed by the apparatus of my invention are attractively shaped for the market and may command better prices than poorly cut fillets obtainable by hand processes.

While I have described the method and apparatus of my invention in one of its preferred embodiments, I realize that modifications may be made in the method and apparatus for carrying out my invention and I accordingly desire that it be understood that no limitations upon my invention are intended other than may be imposed by the scope of the appended claims.

What I claim as new and desire to secure by Letters Patent of the United States is as follows:

1. The method of preparing fish fillets which comprises hydraulically conveying fish after being decapitated and eviscerated to a cutting position, separating the backbone from the fillets by a high speed rotary slicing operation while washing the fish, discharging the backbone in a substantially horizontal direction by centrifugal force, and gravitating the fillets to a collecting position.

2. The method of preparing fish fillets which comprises rotatably driving at high speed a pair of spaced rotary knives, gravitating fish against the spaced rotary knives while continuously washing the fish, for slicing fillets from the fish and severing the backbone from the fish, and discharging the backbone through the spaced rotary knives by centrifugal force to one collecting position while discharging the fillets in a different angular direction to another collecting position.

3. In an apparatus for preparing fillets, a frame structure, a pair of hydraulic conveyors extending from one end of said frame structure to an intermediate position with respect to said frame structure, a transversely extending shaft journalled on said frame structure, means for rotatably driving said shaft, a pair of cutting discs carried by each end of said shaft, said cutting discs extending through slots formed in the ends of each of said hydraulic conveyors, a guide bar supported by said frame structure inclined at an angle and extending between each of said pairs of discs and through the slotted end of the associated hydraulic conveyor, centering means supported with respect to each of said hydraulic conveyors in advance of each of said pairs of cutting discs, and means for flowing water down said hydraulic conveyors for conveying fish through said centering means and through said pairs of cutting discs whereby the backbone of the fish is engaged by said guide bar between said discs and the fillets are sliced from the sides of the fish, and the backbone and fillets separately projected downwardly to different collecting positions.

4. Apparatus for preparing fillets comprising a frame structure, a rotatable shaft journalled on said frame structure, means for rotatably driving said shaft, a pair of spaced cutting discs carried by said shaft, a hydraulic conveyor aligned with said cutting disks and extending from a position adjacent one end of said frame structure downwardly at an angle of approximately 45° to a position substantially embracing opposite sides of said spaced cutting discs, a guide bar supported at opposite ends on said frame structure and extending between the spaced cutting discs and through the lower end of said hydraulic conveyor, centering means carried by said hydraulic conveyor in advance of said cutting discs, and means for flowing water down said hydraulic conveyor for advancing fish through said centering means and through said cutting discs for severing the backbone of the fish from the opposite sides thereof, the side portions being delivered to one collecting position and the backbone being projected along said guide bar to a different collecting position.

5. Apparatus for preparing fillets comprising a frame structure, a rotatably driven shaft journalled on said frame structure, a pair of spaced cutting discs carried by said shaft, a hydraulic conveyor extending from a position adjacent one end of said frame structure and inclined to a position substantially embracing said pair of cutting discs, a guide plate embracing opposite sides of said rotary discs and extending at an angle with respect to the terminus of said hydraulic conveyor, a guide bar supported at opposite ends on said frame structure and extending between said rotary discs at an angle substantially different from the angle of inclination of said guide plate, and means for discharging water down said hydraulic conveyor for moving fish through said cutting discs, whereby fillets are sliced from the fish and directed downwardly by contact with said guide plate to a collecting position while the backbone is projected along said guide bar between said rotary discs to a collecting position remote from the position at which the fillets are collected.

6. Apparatus for preparing fillets comprising a frame structure, a pair of spaced rotatable knives carried by a shaft journalled on said frame structure, means for rotatably driving said shaft, a substantially V-shaped trough supported in an inclined position on said frame structure and slotted at its lower end to substantially embrace opposite sides of said pair of spaced rotary knives, a guide bar supported at opposite ends on said frame structure and extending between said spaced rotary knives on an angle with respect to said frame structure less than the inclined position of said trough, and a guide plate embracing opposite sides of said spaced rotatable knives and extending beneath the lower terminus of said trough in a plane extending at a greater angle with respect to said frame than the inclination of said trough with respect to said frame, whereby fish gravitating down said trough pass through said spaced rotary knives and the backbone and the fillets are separately deflected by said guide bar and said guide plate, respectively, for separately collecting the backbones and fillets in different positions.

7. Apparatus for preparing fillets comprising a frame structure, a pair of spaced rotary knives carried by a shaft journalled on said frame structure, means for rotatably driving said shaft, a substantially V-shaped trough supported in an inclined position on said frame structure and slotted at its lower end to substantially embrace opposite sides of said pair of spaced rotary knives, a guide bar supported at opposite ends on said frame structure and extending between said spaced rotary knives on an angle with respect to said frame structure less than the inclined position of said trough, a guide plate embracing opposite sides of said spaced rotary knives and extending beneath the lower terminus of said trough in a plane extending at a greater angle with respect to said frame than the inclination of said trough with respect to said frame, and centering means supported by said trough in advance of said rotary knives, whereby fish gravitating down said trough pass through said centering means and through said spaced rotary knives and the backbone and the fillets are separately deflected by said guide bare and said guide plate, respectively, for separately collecting the backbones and fillets in different positions.

8. In an apparatus for preparing fillets, a frame structure, a pair of spaced rotary knives journalled on said frame structure, means aligned with said knives and inclined at substantially 45° for gravitating fish into said spaced rotary knives below the axis of said knives, and separate means disposed in different inclined directions for deflecting the backbone of the fish in one direction and the fillets of the fish in a different direction as the fish pass through the rotary knives.

9. Apparatus for preparing fillets comprising a frame structure, a rotary shaft journalled on said frame structure, a pair of spaced rotary knives carried by said shaft, a trough inclined at an angle with respect to said frame structure and having the end thereof slotted to substantially embrace said pair of spaced rotary knives, said trough extending substantially tangent to the cutting edges of said knives, a guide bar supported by said frame structure and extending between said spaced rotary knives and substantially tangent to the cutting edges of said spaced rotary knives and inclined at an angle with respect to said frame structure different from the inclination of said trough, and a guide plate extending on opposite sides of said pair of rotary knives and beyond the lower terminus of said trough, whereby fish gravitating down said trough pass through said spaced rotary knives and the fillets are severed from the backbone, the backbone being discharged through said spaced rotary knives in a direction determined by said guide bar and the fillets being discharged from the end of said trough in a direction determined by said guide plate.

10. Apparatus for preparing fillets comprising a frame structure, a rotary shaft journalled on said frame structure, a pair of spaced rotary knives carried by said shaft, a trough inclined at an angle with respect to said frame structure and having the end thereof slotted to substantially embrace said pair of spaced rotary knives, said trough extending substantially tangent to the cutting edges of said knives, a guide bar supported by said frame structure and extending between said spaced rotary knives and substantially tangent to the cutting edges of said spaced rotary knives and inclined at an angle with respect to said frame structure different from the inclination of said trough, a guide plate extending on opposite sides of said pair of rotary knives and beyond the lower terminus of said trough, and centering means carried by said trough in advance of said rotary knives, whereby fish gravitating down said trough are engaged by said centering means and pass through said spaced rotary knives and the fillets are severed from the backbone, the backbone being discharged through said spaced rotary knives in a direction determined by said guide bar and the fillets being discharged from the end of said trough in a direction determined by said guide plate.

11. Apparatus for preparing fillets comprising a frame structure, a rotatable shaft journalled on said frame structure, means for rotatably driving said shaft, a pair of spaced rotary knives carried by said shaft, a delivery trough inclined from a position adjacent the top of the trough to a position substantially tangent to the peripheries of said rotary knives, said trough being disposed at substantially obtuse angles with respect to a horizontal plane passing through the axis of said transverse shaft, a guide bar supported at opposite ends on said frame and extending between said pair of rotary knives substantially tangent to the peripheries thereof on an angle which is substantially acute with respect to a horizontal plane passing through the axis of said transverse shaft, and a guide plate extending beyond the terminus of said trough and on opposite sides of said rotary knives in a plane forming a smaller obtuse angle with respect to a horizontal plane passing through the axis of said transverse shaft than the obtuse angle at which said trough is supported, whereby fish gravitating down said trough pass through said rotary knives which operate to slice fillets from the fish, the backbone of the fish passing between said spaced rotary knives along said guide bar to one collecting position and the fillets passing under control of said guide plate to a different collecting position.

12. The method of preparing fish fillets which comprises placing decapitated and eviscerated fish in predetermined position for longitudinal movement, subjecting the fish to the force of gravity, guiding the resulting downward movement of the fish in an inclined path, passing water along said path for washing the fish and facilitating the downward movement thereof in said inclined path, the fish acquiring thereby substantial momentum, dividing the fish into three sections by longitudinal cuts in the course of its downward movement, the momentum acquired by the fish being dissipated in forcing said cuts, deflecting the outer two fillet sections of the fish vertically to one receiver and the middle bony section of the fish outwardly to a second receiver.

13. The method of preparing fish fillets which comprises decapitating and eviscerating the fish, placing the fish in predetermined position for longitudinal movement, subjecting the fish to the force of gravity, guiding the resulting downward movement of the fish in a path inclined at approximately 45°, passing water along said path for washing the fish and facilitating the downward movement thereof in said inclined path, the fish acquiring thereby substantial momentum, operating a high speed two blade rotary cutter for dividing the fish into three sections by longitudinal cuts in the course of its downward movement, the momentum acquired by the fish being dissipated in forcing said cuts, deflecting the outer two fillet sections of the fish vertically to one receiver and the middle bony section of the fish outwardly to a second receiver, the blades of said cutter being rotated in the direction of movement of said fish and imparting to said middle section a centrifugal force by which said middle section is projected a substantial distance outwardly from said cutter.

14. The method of preparing fish fillets as set forth in claim 13, wherein said fish is placed back downward for movement towards said cutter, and including the step of spreading the opposite sides of the upper belly portion of the fish preparatory to the cutting operation.

15. The method of preparing fish fillets as set forth in claim 13 and including the step of centering the fish in said inclined path preparatory to the cutting operation.

ALBERT N. FAULKNER.